(12) United States Patent
Mibuari et al.

(10) Patent No.: US 10,111,064 B2
(45) Date of Patent: Oct. 23, 2018

(54) AUTOMATIC SYSTEM AND METHOD FOR CONVERSION OF SMART PHONE APPLICATIONS TO BASIC PHONE APPLICATIONS

(71) Applicant: International Business Machines Corporation, Armonk, NY (US)

(72) Inventors: Eric Mibuari, Nairobi (KE); Osamuyimen Stewart, Piscataway, NJ (US); Aisha Walcott-Bryant, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/623,469

(22) Filed: Jun. 15, 2017

(65) Prior Publication Data

US 2017/0353814 A1   Dec. 7, 2017

Related U.S. Application Data

(62) Division of application No. 15/029,068, filed as application No. PCT/KE2014/000039 on Oct. 13, 2014, now Pat. No. 9,763,022.

(30) Foreign Application Priority Data

Oct. 14, 2013   (KE) ................ KE/P/2013/001930

(51) Int. Cl.
*H04W 40/24* (2009.01)
*H04W 4/50* (2018.01)
(Continued)

(52) U.S. Cl.
CPC ............. *H04W 4/50* (2018.02); *H04W 4/001* (2013.01); *H04M 1/72522* (2013.01)

(58) Field of Classification Search
CPC . H04W 4/001; H04W 24/06; H04M 1/72563; H04M 1/72544; G06F 17/30876;
(Continued)

(56) References Cited

U.S. PATENT DOCUMENTS

2010/0251231 A1   9/2010   Coussemaeker et al.
2011/0136461 A1   6/2011   Hauser et al.
(Continued)

FOREIGN PATENT DOCUMENTS

CN   101637037 A   1/2010
CN   102542410 A   7/2012
(Continued)

OTHER PUBLICATIONS

List of IBM Patents or Patent Applications Treated as Related, dated Jun. 15, 2017, 2 pages.

*Primary Examiner* — Phuoc H Doan
(74) *Attorney, Agent, or Firm* — Scully, Scott, Murphy & Presser, P.C.; Udi Einhorn

(57) ABSTRACT

A system and method is disclosed for converting smart cell phone applications to applications that operate on basic cell phones. The invention has a classifying process that classifies one or more functions of a cell phone application into those functions capable being performing by a basic cell phone and those functions, missing functions, that can not be performed by a basic cell phone. Substitute functions for the missing functions are developed. An emulator monitors the execution of the cell phone application and provides the substitute cell phone functions at points in the execution where a missing function is to be executed. Therefore, the smart phone application is converted into a basic phone application that can be executed by the basic cell phones with reduced functionality. The invention can run on a smart phone or a server. The invention can also be provided as a server based service for basic cell phone users.

13 Claims, 5 Drawing Sheets

(51) Int. Cl.
*H04W 4/00* (2018.01)
*H04M 1/725* (2006.01)

(58) Field of Classification Search
CPC ............. G06F 17/218; G06F 17/30867; G06F 17/30598; G06F 17/30345
USPC ................... 455/419; 709/224; 717/130, 128
See application file for complete search history.

(56) References Cited

U.S. PATENT DOCUMENTS

| | | |
|---|---|---|
| 2013/0086645 A1 | 4/2013 | Srinivasan et al. |
| 2013/0086657 A1* | 4/2013 | Srinivasan .............. H04L 63/10 726/6 |
| 2013/0219057 A1 | 8/2013 | Li et al. |
| 2014/0317605 A1* | 10/2014 | Gataullin ............ G06F 11/3636 717/128 |
| 2015/0007145 A1 | 1/2015 | Pierce et al. |

FOREIGN PATENT DOCUMENTS

| | | |
|---|---|---|
| CN | 102880379 A | 1/2013 |
| CN | 103154905 A | 6/2013 |
| WO | 0056033 A1 | 9/2000 |
| WO | 0184868 A1 | 11/2001 |

\* cited by examiner

AUTOMATIC SYSTEM AND METHOD FOR CONVERSION OF SMART PHONE APPLICATIONS TO BASIC PHONE APPLICATIONS

CROSS-REFERENCE TO RELATED APPLICATIONS

This application is a divisional of U.S. patent application Ser. No. 15/029,068, filed Apr. 13, 2016, which is a National Stage Entry of PCT/KE2014/000039 filed Oct. 13, 2014, which claims priority to Kenyan provisional patent application KE/P/2013/001930, filed 14 Oct. 2013, the contents of which are incorporated herein by reference.

TECHNICAL FIELD

This invention relates to the field of mobile communication devices. More specifically, the invention relates to a converter that transforms a smart phone application into an application that can be run a basic phone. A basic phone is defined as a phone with only rudimentary display (text only) and Global System for Mobile Communications (GSM) telephony capabilities (calling and messaging) and no browser or data capabilities.

BACKGROUND

The adoption of mobile phones in the world has been nothing short of phenomenal over the last two decades. The International Telecommunication Union estimated that by 2011 there were more than 5 billion mobile phones in the world. Of these 5 billion phones, 80% (4 billion) were simple basic phones, while 20% (1 billion) were smart phones. On top of offering basic telephony, smart phones have transformed their users' lives by delivering the power and functionality of traditional computers especially through smart phone applications ("apps"). On the other hand, users of basic phones have, for the most part, been left out of the "mobile computing revolution" due to the limited hardware and software capabilities of the devices. The primary limitations include limited screen size, lack of access to local, on phone, computation and storage, and lack of features such as cameras, GPS sensors and accelerometers, and lack of browser and data capabilities.

Nevertheless, basic phones can still provide access to compute power to a user by leveraging the ability of voice, and especially protocols such as SMS (Short Message Service) and USSD (Unstructured Supplementary Service Data). Such protocols communicate with a remote server, which does the computation and storage, and then transmits results back to the user.

Even so, the number of applications running on basic phones is orders of magnitude less than the number running on smart phones. The limited capabilities afforded by voice, SMS and USSD means that only a small subset of smart phone applications' functionalities can be implemented directly on a basic phone. On top of this, if one is to convert an existing smart phone application for basic phone use, it entails rewriting most of the application's code from scratch and running it on an application server.

There is currently no way to automatically convert a smart phone application to a basic phone application. The manual process requires a developer to first run the smart phone application, and determine the functionalities of the app. The developer then decides which subset of these functionalities is possible to implement for basic phone users. More specifically, there are not systems or methods in place that address the key challenges to automatically converting a smart phone app to a basic phone version. These challenges include 1) quick identification of supported and unsupported functionalities of an app for a basic phone; 2) immediate access to the existing 1.6 million or more available apps on a basic phone; and 3) no automated or standardized method to convert an app to a basic phone version.

Relevant art: US 20110136461; US 20100251231.

SUMMARY OF THE INVENTION

One aspect of the invention is to provide greater functionality for mobile devices, particularly cell phones.

Another aspect of the invention is to provide functionality for basic cell phones to permit the basic cell phone to automatically run one or more smart phone applications.

Another aspect of this invention is an emulator that is used in conjunction with a basic cell phone to permit the basic cell phone to use and execute smart phone applications.

Another aspect of this invention is a cell phone using an emulator that enables the cell phone to use and execute smart phone applications.

In various aspects the invention is a system and method for converting smart cell phone applications to applications that operate on basic cell phones. The invention has a classifying process that classifies one or more functions of a cell phone application into those functions capable being performing by a basic cell phone and those functions, missing functions, that cannot be performed by a basic cell phone. Substitute functions for the missing functions are developed. An emulator monitors the execution of the cell phone application and provides the substitute cell phone functions at points in the execution where a missing function is to be executed. Therefore, the smart phone application is converted into a basic phone application that can be executed by the basic cell phones with reduced functionality. The invention can run on a smart phone or a fixed server. The invention can also be provided as a server based service for basic cell phone users. In various aspects the methods and systems of the invention do not involve any modification to a basic phone. That is, the basic phone remains unchanged with the same functionality provided at the time of manufacture. Thus, no specialized software is required to be installed on the basic phone, and there are no hardware or software modifications required on the basic phone in order to carry out the methods described herein.

Emulator

In an aspect is an emulator comprising: an application tracer (AT) configured to identify a node in a pruned Smart Application Model that correlates to a location in an executing smart phone application, and to extract an instruction from a node in a Basic Phone Interaction Graph that correlates to the identified node in the pruned Smart application model; and an interaction handler (IH) configured to receive the instruction from the AT, prepare a message from the instruction, and transmit the message to a user.

In embodiments:

the smart phone application comprises machine-readable instructions residing on a server, and wherein the AT is configured to track the execution of the smart phone application on the server;

the wherein the smart phone application comprises machine-readable instructions residing on a server, and wherein the pruned Smart application model and the Basic Phone Interaction Graph each comprise machine-readable information stored in a memory on the server;

the smart phone application has an associated User Interface Frames Graph that comprises features of the smart phone application;

the pruned Smart Application Model comprises features of the smart phone application that can be implemented on a basic phone or that are recoverable for implementation on the basic phone;

the pruned Smart Application Model comprises features of the smart phone application that can be implemented on a basic phone or that are recoverable for implementation on the basic phone, and wherein the Basic Phone Interaction Graph comprises nodes topologically equivalent to the nodes of the pruned. Smart Application Model, and wherein at least one node in the Basic Phone Interaction Graph comprises an instruction configured to be converted by the IH into an SMS or USSD message;

the IH is further configured to receive messages from the user, convert the messages to a User Interface input, and relay the User Interface input to the AT;

the extracted instruction comprises message metadata, language fragments, text, bitmap data, or ASCII graphics data, or a combination thereof;

the user is a basic phone on a cellular network;

the user is a basic phone on a cellular network, and the basic phone is unmodified from manufacture;

the user is a basic phone on a cellular network, and the basic phone consists or consists essentially of the hardware and software that was installed upon manufacture;

the user is a basic phone on a cellular network, and the basic phone does not contain any software that was not installed by the manufacturer;

the application tracer comprises machine-readable instructions residing on a server, and wherein the interaction handler comprises machine-readable instructions residing on the server.

In an aspect is a method of using the emulator as above, the method comprising the steps: initiating the smart phone application on a server by the AT in response to a request received from a basic phone; and tracking the smart phone application on the server by the AT.

In embodiments:

initiating the smart phone application comprises identifying a homepage node in the User Interface Frames Graph, and wherein tracking the smart phone application comprises: identifying a corresponding node in the pruned Smart Phone Application Model; relating the identified node in the pruned Smart Phone Application Model to a corresponding node in the Basic Phone Interaction Graph; and extracting a message from the corresponding node in the Basic Phone Interaction Graph;

the method further comprises: extracting, by the AT, an instruction from the Basic Phone Interaction Graph; passing the extracted instruction to the IH; converting, by the IH, the extracted instruction into a USSD or SMS message; and transmitting, by the IH, the USSD or SMS message to the basic phone;

the method further comprises: extracting, by the AT, an instruction from the Basic Phone Interaction Graph; passing the extracted instruction to the IH; converting, by the IH, the extracted instruction into an ASCII sequence or an audio message; and transmitting, by the IH, the ASCII sequence or audio message to the basic phone;

the method further comprises receiving input from the basic phone, wherein the IH converts the input to a User Interface input, and relays the User Interface input to the AT;

tracking the smart phone application on the server by the AT comprises: arriving at a screen in the smart phone application; and correlating the screen to a node in the pruned Smart Application Model;

tracking the smart phone application on the server by the AT comprises: arriving at a screen in the smart phone application that corresponds to a node in the pruned Smart Application Model having pruned child nodes; and passing, by the AT, a termination message to the IH; and tracking the smart phone application on the server by the AT comprises: arriving at a node in the User Interface Frames Graph that corresponds to a node in the pruned Smart Application Model having pruned child nodes; and passing, by the AT, a termination message to the IH.

In an aspect is an emulator comprising: an application tracer (AT) that references a pruned application model, where the AT tracks the execution of a smart phone application and identifies a point in the smart phone application where a basic cell phone needs a missing function necessary to execute the smart phone application; and an interaction handler (IH) that generates a substitute cell phone function that substitutes for the missing function.

In an aspect is a system for executing a smart phone application on a basic phone, the system comprising: a pruned Smart Application Model (SAM) comprising a plurality of nodes corresponding to functions of the smart phone application that are executable on the basic phone or recoverable; a Basic Phone Interaction Graph (BPIG) comprising a plurality of nodes topologically equivalent to the nodes of the pruned SAM, wherein each node of the BPIG comprises an instruction; an application tracer (AT) comprising machine readable instructions configured to track execution of the smart phone application and to extract an instruction from a node in the Basic Phone Interaction Graph that correlates to a node in the pruned Smart application model; and an interaction handler (IH) comprising machine readable instructions configured to receive the instruction from the AT, prepare a message from the instruction, and transmit the message to a user.

In embodiments:

the system further comprises a User Interface Frames Graph (UIFG) comprising a plurality of nodes corresponding to all functions of the smart phone application;

the IH is further configured to receive messages from the user, convert the messages to a User Interface input, and relay the User Interface input to the AT; and the extracted instruction comprises message metadata, language fragments, text, bitmap data, or ASCII graphics data, or a combination thereof.

In an aspect is a method of using the system as above, the method comprising the steps: initiating the smart phone application on a server by the AT in response to a request received from the basic phone; and tracking the smart phone application on the server by the AT.

In an aspect is an emulator comprising: an application tracer (AT) that references a pruned application model, where the AT tracks the execution of a smart phone application and identifies a point in the smart phone application where a basic cell phone needs a missing function necessary to execute the smart phone application; and an interaction handler (IH) that generates a substitute cell phone function that substitutes for the missing function.

In embodiments:

the substitute cell phone function comprises one or more of the following: (i) an input from a basic cell phone user that the IH converts to an input to the smart phone application and sends to the smart phone application; and (ii) an output from the smart phone application that the IH converts and sends to the basic cell phone user;

the substitute cell phone function comprises one or more of the following: an SMS message and a USSD message;

the missing function comprises one or more of the following: features, Input/Output (I/O) widgets, and screens;

the missing function comprises one or more of the following: features, Input/Output (I/O) widgets, and screens, and wherein the features are provided by smart phone hardware or smart phone software;

the missing function comprises one or more of the following: features, Input/Output (I/O) widgets, and screens, and wherein the features are smart phone hardware, and wherein the features include one or more of the following: a global positioning system (GPS), and an internet interface;

the missing function comprises one or more of the following: features, Input/Output (I/O) widgets, and screens, and wherein the Input/Output (I/O) widgets are one or more elements on a graphical user interface of the smart phone application where user input and system/application output is displayed;

the missing function comprises one or more of the following: features, Input/Output (I/O) widgets, and screens, and wherein the screens include one or more visible interfaces used by the smart phone application; and the missing function comprises one or more of the following: features, Input/Output (I/O) widgets, and screens, and wherein the screens include one or more visible interfaces used by the smart phone application, and wherein one or more screens include one or more Input/Output I/O widgets.

In an aspect is an emulator comprising: an application tracer (AT) configured to identify a node in a pruned Smart Application Model that correlates to a node in a User Interface Frames Graph of a smart phone application, and to extract an instruction from a node in a Basic Phone Interaction Graph that correlates to the identified node in the pruned Smart application model; and an interaction handler (IH) configured to receive the instruction from the AT, prepare a message from the instruction, and transmit the message to a user.

Device

In an aspect is a device comprising machine-readable instructions configured to cause the device to implement an emulator, the emulator comprising: an application tracer (AT) configured to identify a node in a pruned Smart Application Model that correlates to a location in an executing smart phone application, and to extract an instruction from a node in a Basic Phone Interaction Graph that correlates to the identified node in the pruned Smart application model; and an interaction handler (IH) configured to receive the instruction from the AT, prepare a message from the instruction, and transmit the message to a user.

In embodiments:

the device is a server configured to interact with a basic phone via a cellular network;

the smart phone application comprises machine-readable instructions residing on the server, and wherein the AT is configured to track the execution of the smart phone application on the server;

the User Interface Frames Graph consists of features of the smart phone application;

the pruned Smart Application Model comprises features of the smart phone application that can be implemented on a basic phone or that are recoverable for implementation on the basic phone;

the Basic Phone Interaction Graph comprises nodes topologically equivalent to the nodes of the pruned Smart Application Model, and wherein the nodes of the Basic Phone Interaction Graph comprise an instruction;

the Basic Phone Interaction Graph comprises nodes topologically equivalent to the nodes of the pruned Smart Application Model, and wherein the nodes of the Basic Phone Interaction Graph comprise an instruction, wherein the instruction comprises text suitable for SMS or USSD messages, a string of ASCII characters, a sound, metadata, or combinations thereof;

the IH is further configured to receive messages from the user, convert the messages to a User Interface input, and relay the User Interface input to the AT, and optionally to signal a transition to a subsequent state;

the device is a multipurpose computer, a special purpose computer, or a mobile device other than a basic phone; and the IH converts the message received from the AT to text suitable for transmission as a USSD or SMS message prior to transmitting the message to the user.

In an aspect is a method of executing a smart phone application on a basic phone using the device as above, the method comprising: initiating the smart phone application on the server by the AT in response to a request received from a basic phone; and tracking the smart phone application on the server by the AT.

In embodiments:

initiating the smart phone application comprises identifying a homepage node in the User Interface Frames Graph, and wherein tracking the smart phone application comprises: identifying a corresponding node in the pruned Smart Phone Application Model; relating the identified node in the pruned Smart Phone Application Model to a corresponding node in the Basic Phone Interaction Graph; and extracting an instruction from the corresponding node in the Basic Phone Interaction Graph;

the method further comprises: extracting, by the AT, an instruction from the Basic Phone Interaction Graph; passing the extracted message to the IH; converting, by the IH, the extracted message into a USSD or SMS message; and transmitting, by the IH, the USSD or SMS message to the basic phone;

the method further comprises receiving input from the basic phone, wherein the IH converts the input to a User Interface input, and relays the User Interface input to the AT; and tracking the smart phone application on the server by the AT comprises: arriving at a screen in the smart phone application that corresponds to a node in the pruned Smart Application Model having pruned child nodes; and passing, by the AT, a termination message to the IH.

In an aspect is a server comprising: a network interface for receiving instructions from an executing smart phone application; a pruned application model that identifies a point in the executing smart phone application where a basic cell phones requires a missing function necessary to execute the smart phone application; an application tracer (AT) that references a pruned application model, where the AT tracks the execution of a smart phone application and identifies a point in the smart phone application where a basic cell phone needs a missing function necessary to execute the smart phone application; and an interaction handler (IH) that generates a substitute cell phone function that substitutes for the missing function.

Method of Using

In an aspect is a method of executing a smart phone application on a basic phone, the method comprising the steps: (a) correlating an activity by a smart phone application executing on a server with a node in a pruned Smart Application Model (SAM); (b) identifying a node in a Basic Phone Interaction Graph (BPIG) that correlates with the node in the pruned SAM from (a); (c) extracting an instruction from the BPIG node identified in (b); (d) constructing a message from the extracted instruction; and (e) transmitting the message to the basic cell phone.

In embodiments:

the message is a USSD or SIM message;

the message is an audio message;

the method further comprises, prior to (b), initiating the smart phone application on a server in response to receiving a request from the basic cell phone to execute the smart phone application;

the method further comprises determining that the node in the pruned SAM is a terminal node, and returning a termination message after transmitting the message to the basic cell phone;

steps (a)-(c) are carried out by an application tracer function of an emulator on the server;

steps (d)-(e) are carried out by an interaction handler function of an emulator on the server;

the method further comprises receiving an input from the basic phone after transmitting the message;

the method further comprises receiving an input from the basic phone after transmitting the message, wherein the received input is provided to the smart phone application to generate a subsequent activity;

wherein the message is a USSD or SIM message, and the method further comprises receiving an input from the basic phone after transmitting the message, wherein the received input a USSD or SIM message and is provided to the smart phone application to generate a subsequent activity;

the method further comprises receiving an input from the basic phone after transmitting the message, wherein the received input is provided to the smart phone application to generate a subsequent activity, and wherein steps (a)-(e) are repeated with the subsequent activity;

the pruned SAM comprises features of the smart phone application that can be implemented on the basic phone or that are recoverable for implementation on the basic phone;

the method further comprises, prior to step (a), generating the pruned SAM by comparing a features table of the smart phone application with a recoverability table;

the activity by the smart phone application is selected from a feature, an Input/Output (I/O) widget, and a screen;

the server is selected from a special purpose computer, a general computer, and a mobile device; and the smart phone application comprises features that generate graphics and interactive displays.

In an aspect is a server comprising machine-readable instructions configured to implement the method as above.

In an aspect is a method of executing a smart phone application on a basic phone, the method comprising the steps: receiving at a server a request from the basic cell phone to execute the smart phone application, the basic cell phone needing one or more missing functions necessary to execute the respective smart phone application; tracking the execution of the smart phone application on the server and determining a point in the execution when a function of a smart phone application needs to be recovered or replaced; and providing instructions to the basic phone to execute a substitute cell phone function at the determined point of execution.

Method of Making

In an aspect is a computer process comprising the steps of: (a) classifying a function of a smart phone application as a recoverable function, wherein the recoverable function comprises operations that are executable on a smart phone but are not executable on a basic phone; and (b) automatically generating a substitute function that mimics the recoverable function, wherein input and output for the substitute function is limited to operations available on the basic cell phone.

In embodiments:

the smart phone application further comprises a function that is executable on a basic phone;

the smart phone application further comprises a function that is neither executable on a basic phone nor is a recoverable function;

the smart phone application further comprises a function that is neither executable on a basic phone nor is a recoverable function, and is selected from an accelerometer, a gyroscope, a compass, and a camera;

the method further comprises executing the smart phone application and monitoring the execution of the smart phone application, and further comprising executing the substitute function at a point in the execution of the smart phone application where the recoverable function is called;

the method further comprises, prior to step (a), reviewing a set of operations needed to carry out the function of the smart phone application;

the operations available on a basic cell phone are selected from: sending an SMS or USSD message; receiving an SMS or USSD message; displaying one or a plurality of ASCII characters; generating a noise; and recording a sound;

the operations available on a basic cell phone are selected from: sending an SMS or USSD message; receiving an SMS or USSD message; displaying one or a plurality of ASCII characters; and generating a noise;

the operations that are executable on a smart phone but are not executable on a basic phone are selected from: a graphics display; a location determination; and a touch screen I/O operation;

the method further comprises executing the smart phone application on a server selected from a special purpose computer, a multipurpose computer, and a mobile device, and further comprising monitoring the execution of the smart phone application on the server, and further comprising executing the substitute function at a point in the execution of the smart phone application where the recoverable function is called, wherein instructions for executing the smart phone application are received from a basic phone via a cellular network;

the method further comprises repeating steps (a) and (b) for a plurality of functions of the smart phone application; and wherein the method further comprises classifying a function of the smart phone application as an unrecoverable function, wherein the function comprises operations that are executable on a smart phone but are not executable on a basic phone.

In an aspect is a computer system comprising machine-readable instructions configured to implement the computer process as above.

In embodiments:

the computer system is a server selected from a special purpose computer, a general purpose computer, and a mobile device; and the method further comprises a recoverability list comprising operations that are executable on a smart phone but are not executable on a basic phone, and a corresponding list of substitute operations that are executable on a basic phone.

In an aspect is a computer process comprising the steps of: classifying each of a plurality of functions of a cell phone application as either a function capable of being performing by a basic cell phone or a missing function required to execute the cell phone application but not available on the basic cell phone; providing a substitute cell function for at least one of the classified missing function, the substitute cell phone function capable of being executed by the basic cell phone; and emulating the cell phone application to monitor the execution of the cell phone application and provide a substitute cell phone function at a point in the execution of the cell phone application where the respective missing function is to be executed, wherein the smart phone application is converted into a basic phone application provided to the basic cell phone.

In an aspect is a computer system for converting a cell phone application comprising: a memory, a central processing unit, and a network interface; a classifying process that classifies each of a plurality of functions of a cell phone application as either a function capable of being performing by a basic cell phone or a missing function required to execute the cell phone application but not available on the basic cell phone; a substitution process that provides a substitute cell function for at least one of the classified missing function, the substitute cell phone functions capable of being executed by the basic cell phone; and an emulator that monitors the execution of the cell phone application and provide a substitute cell phone function at a point in the execution of the cell phone application where the respective missing function is to be executed, wherein the smart phone application is converted into a basic phone application provided to the basic cell phone.

These and other aspects of the invention will be apparent to the skilled artisan based on the disclosure provided herein.

DETAILED DESCRIPTION OF SELECTED EMBODIMENTS

Figure 1:
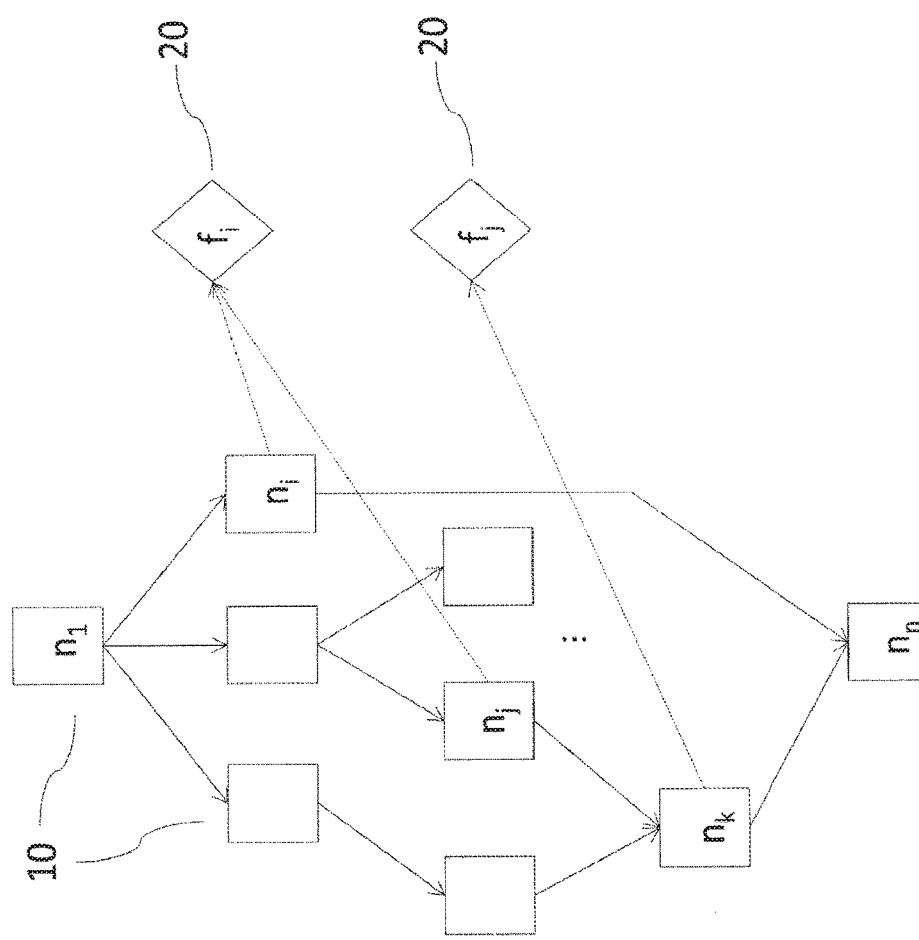
FIG. 1 is an example construction of UI Frames Graph.

A preferred aspect of the present invention is an automatic converter system and method that takes a smart phone application's source code as the input and generates two outputs—(a) a limited version of the original smart phone application called the Basic Phone Interaction Graph (BPIG), and (b) a User Emulator. In a preferred embodiment, the converter's task is a one-time operation per application.

A preferred aspect of the present invention is a new basic phone application that comprises the basic phone user interface and a backend composed of a User Emulator and the pruned (i.e. reduced functionality) smart phone application.

Preferred automated processes used by the automatic converter system in a preferred embodiment are disclosed to generate basic phone applications from existing smart phone applications. Example processes include:

automatic classification of the functionalities of an existing smart phone application into those that can and those that cannot be implemented on a basic phone;

automatic reduction of a smart phone application's functionality to a subset that can either be accessed directly through a basic phone or has a good enough substitute using basic phone capabilities; and offering of the reduced smart phone application using the software-as-a-service model, server based application, and/or smart phone based application for access by multiple distributed basic phone users.

Three of the advantages our invention offers follow.

(1) Functionality Coverage. The manual process of converting a smart phone application involves human thought and manual inspection to evaluate which of the smart phone's functionality can or cannot be implemented on the basic phone. This process is error prone and may lead to the creation of a basic phone application with less functionality than is possible. A human may not be aware of all the recoverability options for basic phone applications.

(2) Programming Language Independence. Our method does not require the smart phone application to be developed for a specific Mobile OS (Operating System) or programming language. Consequently, smart phone applications for all Mobile OS'es can be converted using the invention.

(3) Efficiency. The conversion process involves little or no rewrite of the source application's functionality. As a result, the time to roll out a solution is significantly reduced (e.g., from months of development to minutes of automatic conversion). The smart phone's application is ported as-is to the back-end system and the additional code module (User Emulator) is generated automatically.

Described here among other things are preferred steps involved in the conversion of a smart phone application into a basic phone application. In a preferred embodiment, the invention processes smart phone applications that adhere to the Model View Controller (MVC) architecture.

A number of modules make up the features of one preferred embodiment of one aspect of this invention; the smart phone application to basic phone application conversion—the automatic conversion system and method. The preferred processes/steps are listed in the table below:

TABLE 1

Smart Phone Application to Basic Phone Application Conversion Steps:

1. Data Collection (Goal: create Mobile OS and Language Keyword databases)
   a. Mobile OS and Programming Language Mapping - collect mobile OS and programming language specific keywords based on features and UI elements. (Obtain a Feature-Keyword Table, Frames-Keyword Table, and I/O Widget-Keyword Table to creat the Mobile OS and Language Keyword database.)
2. Representation (Goal: Pruned SAM)
   a. SmartApp Modeling - build a model of the smart phone application (create the UIFG and Features Hashmap, by looking at the smart phone application source code)

TABLE 1-continued

Smart Phone Application to Basic Phone Application Conversion Steps:

b. Pruning - remove parts of SmartApp model not support by basic phones to generate the pruned SAM
3. Conversion (Goal: Converted Applications)
   a. Recovery - apply recovery procedure and generate Basic Phone Interaction Graph (BPIG), thus creating converted applications.
4. Execution (Goal: enable a basic phone to carry out smart phone application via a user emulator)
   a. User Emulator - create module that is responsible for the interaction between the basic phone user and the converted application
   b. Manage requests - at run time manage basic phone requests to run specific converted smartphone applications I. Data Collection To convert an existing smart phone application to a basic phone version, a process to gather mobile OS and programming language specific keywords is required. The keywords are those that denote features, Input/Output (I/O) widgets, and screens. Features are mobile phone hardware, input and output resources, software, and combinations thereof that are specific to the make and model of the phone and enable the phone to carry out tasks. For example, features include a camera, GPS module, internet connectivity, and the like.

I/O widgets are elements on the graphical user interface of an application where user input and system/application output is displayed and determined. For example, I/O widgets include radio buttons and other buttons, drop-down menus, text boxes, etc.

Screens represent the application's visible interface to the user. A unique screen presents one or more I/O widgets to the user. Screens may also present information such as maps and the like.

The converter requires a way to identify these specific elements (features, widgets, and screens). A repository is created to map the elements of an application based on the specific mobile OS and programming language-keywords. Given the keywords, the converter can search through source code and identify features, widgets, and screens.

More specifically, as a part of the data collection step, three keyword tables are maintained. The keyword tables are: i) the Feature-Keyword table, ii) the I/O Widget-Keyword table, and iii) the Frames-Keyword table. The features are identified based on the technical manual of a smart phone. The manual will detail the resources and capabilities of the specific smart phone. Keywords for widgets and initiating screens are identified by searching the API of the programming language and storing the element with its associated syntax. For example, in Java most GUI elements will inherit from the same object and are stored in the same package.

Feature-Keyword Table

Features are resources found on smart phones including I/O devices such as cameras and audio recorders; sensors such as GPS and accelerometers; and communication facilities such as Wi-Fi antennae and Bluetooth receivers.

In one embodiment the keywords within the SmartApp source code are found using a Feature-Keyword table. This table maps each feature of a smart phone to its specific Mobile OS and programming language keywords. For example, on the Android OS, the GPS feature is accessed using the LocationManager class, as illustrated below:

LocationManager locManager=(LocationManager) this.getSystemService(Context.LOCATION_SERVICE);

Thus, the row in the Feature-Keyword table associated with the GPS would be represented as in the following Table.

TABLE 2

| Feature | Mobile OS | Language | Keywords |
|---|---|---|---|
| GPS | Android | Java | "LocationManager" ".getSystemService" "Context.LOCATION_SERVICE" |

In general, the Feature-Keywords table is stored in the repository to be used later during the conversion process. The table must be updated periodically as smart phones with new features are created and when some features are removed.

I/O Widget-Keyword Table

I/O widgets are input and output components found on the UI (user interface) of a smart phone application. They include GUI (Graphical User Interface) elements such as textboxes, buttons and tabs as well alerts, dialogs and other pop ups. In general, these widgets are often depicted by keywords that are semantically interpretable—where the widget keyword(s) is the same as or similar to what the widget represents. For example, a textbox is a box for textual characters.

The I/O Widget-Keyword Table lists for every I/O widget available in every programming language, the corresponding code (and syntax) that refers to each different type of I/O widget.

Consider, for example, an XML-based UI representation, where keywords include the names of widgets found within a screen's XML tree file. An example for a checkbox on Android is shown below followed by an example row in the table,

```
<CheckBox
android:id="@+id/checkboxID"
android:layout_width="match_parent"
android:layout_height="wrap_content"
android:text="@string/checkbox"/>
```

TABLE 3

| I/O Widget | Mobile OS | Language | Keywords and Syntax |
|---|---|---|---|
| Checkbox | Android | Java | <CheckBox android:id="@+id/checkboxID" android:layout_width="match_parent" android:layout_height="wrap_content" android:text="@string/checkbox"/> |

If the programming language follows an object-oriented paradigm, then most, if not all, widgets inherit from a specific base class. As a result, pre-defined and user-defined widgets can be found if they inherit from the same base class. Additionally, most languages provide developers with a specification of all possible ways do input and output. These assumptions are used applied in order to capture and store all the I/O widgets represented in a mobile OS and programming language.

Frames-Keyword Table

The final piece of information gathered during the data collection step, is creating a storing the keywords that create a screen change within an application. A screen change is any element that causes the display of one screen to change. For example, a screen within an application may have a textbox, and then a pop-up message is displayed. The change, or UI screen change, between the two screens is the screen with the textbox and the screen with the textbox and pop-up message. In general, screen changes occur to facilitate a user navigating through an application, or the application displaying information back to the user.

The Frames-Keyword is created to represent the set of keywords that denote a transition from screen to screen by identifying the code keywords that refer to a UI screen change. More specifically, when a user starts a smart phone application, he/she will likely interact with the application by transitioning through multiple screens to accomplish a task (or complete a functionality) of that application.

For example, an application's landing page may have buttons that, when clicked, open new frames for each of the top-level functionalities of the application. A subsequent screen may facilitate the collection of inputs from a user, followed by a screen that shows the results of computation back to the user.

In Apple's iOS, the UINavigationController helps manage the navigation from screen to screen. It helps manage a "navigation stack", a hierarchical metaphor onto which new screens are pushed and popped. Below is an example code snippet:

this.mySecondScreen=new mySecondScreen( );
this.NavigationController.PushViewController(this.mySecondScreen, true);

This code instantiates a screen called mySecondScreen, pushes it onto the navigation controller and sets it to true so that it navigates. As a result, to find screen transitions for an iOS smart app, the code for creating a new screen and adding it to the navigation controller must be included in the Frames-Keyword table as follows.

TABLE 4

| Mobile OS | Language | Frames Keywords and Syntax |
|---|---|---|
| iOS | Objective-C | "NavigationController.PushViewController" |

Creating these tables requires examining the relevant programming languages, for example, using the API documentation and library definitions.

II. Representation

In one embodiment the invention constructs an abstract representation of the smart phone application called the SmartApp Model (SAM). The model is used to automatically identify all the functionality of an application, and to determine which parts of the application cannot be supported on a basic phone.

The SmartApp model is composed of a graph, called the UI Frames Graph and a hashmap, called the Features Hashmap (see FIG. 1). The UI Frames Graph is constructed by creating a node for each screen that may be accessed during execution of the smart phone application. A first node is connected by an "edge" to a second node where the second node (which represents a screen) is accessible from the first node (which represents another screen) during the execution of the application. For example, a first screen may include a touch button that, when selected, takes the user to a second screen. In such case the two nodes representing the two screens are connected by an edge in the UI Frames Graph.

FIG. 1 provides an example of UI Frames Graph. Nodes (10) are represented by squares, and features (20) are represented by diamonds. Nodes $n_i$ and $n_j$ access (and point to) feature $f_i$, which may be a microphone, for example. Node $n_k$ accesses feature $f_j$, which may be a camera, for example. Nodes $n_l$ and $n_n$ are the application start and application end nodes, respectively. The corresponding Features Hashmap is shown in the following table.

TABLE 5

| Feature | Node(s) |
|---|---|
| Microphone | $n_i$, $n_j$ |
| Camera | $n_k$ |

A preferred algorithm for constructing the SAM is presented below.

TABLE 6

Build-SmartAppModel(SourceCode source, Feature-Keyword-Table featureTable, I/O-Keyword-Table ioTable, UIFrame-Keyword-TableframesTable) returns a SmartApp model.
1. G ←Build-UI-Frames-Graph(source, ioTable, framesTable)
2. H ←Create-Features-Hashmap(G, featureTable)
3. return SmartAppModel <G, H>

The UI Frames Graph represents all the possible screen transitions that can occur from the time a user starts up a smart phone application, to the time the user is finished using the application. A UI Frames Graph, G=<N,E>, where N is the set of nodes in the graph and E is the set of edges in the graph. A node denoted $n_i$, contains a unique screen (UI frame) from the application, and the associated view and controller files. In Android, for example, the view and controller files are found within the source code with a specific syntax that links the controller code to the XML file.

An edge between nodes $n_i$ and $n_j$ is denoted $e_{ij}$, and represents either a deliberate user navigation action to a new screen, or a screen change caused by the application (e.g., displaying information to the user). The root node is the landing page for the application. FIG. 1 illustrates an example UI frames graph for an Android application. The general procedure to construct a UI frames graph is shown below. The graph can be constructed following a modified depth-first search (DFS) or breadth first-search procedure to discover nodes and edges and insert them into the graph.

TABLE 7

Build-UI-Frames-Graph (SourceCode source, I/O-Keyword-Table ioTable, UIFrame-Keyword-Table framesTable) returns the UI frames graph for the application.
1. G ←initialize_empy_graph( )
2. currentNode ← get_landing_page(source)
3. add_view_code(currentNode)
4. add_controller_code(currentNode)

TABLE 7-continued 5. run DFS until termination node reached (ie. no transitions to another screen)
   a. create new nodes for each UI Frame from currentNode using the framesTable
   b. create edge from current node to new node
   c. insert new node and edge into graph
6. return G A path through the UI Frames graph starts at the application's landing page and terminates at termination nodes—nodes that represent screens where the user cannot navigate to any other new screens. A path through the graph starting at the route and ending at a termination node represents one complete functionality of the application. As a result, the set of all unique paths through an application's UI Frames graph represents all the possible different functionalities of the application.

The second component of the SmartApp model for representing an application is to create a hashmap, called the Features Hashmap. The Features Hashmap is a table of key-value pairs, and represents the parts of the application that depend on a smart phone feature. A key in the hashmap corresponds directly to a feature (such as GPS and camera). The value for a feature is a list of zero or more UI Frames graph nodes as shown below. A node is included in the list that corresponds to a feature, if and only if, the node's view or controller files reference a feature.

<feature1, <n1, ..., ni>>
...
<featurem, <nj, ..., nk>>.

The Features Hashmap is created by traversing the UI Frames Graph, and using the view and controller code for each node. A search for feature keywords, using the Feature-Keyword table, is done inside each view and controller file to find any dependent features. This process is summarized in the algorithm below.

TABLE 8

Create Features Hashmap(UI Frames Graph framesGraph, Feature-Keyword-Table featureTable) returns a Feature Hashmap
1. featureHashmap ← Initialize a Features-Hashmap with the list of feature in featureTable
2. For each node in the framesGraph get associated view and controller files
3.   Search the view and controller files for feature keywords using feature Table
4.   If there is a feature keyword then add the node to the matching feature in the featureHashmap
5. return featuresHashmap III. Pruning Pruning is the process of reducing the UI Frames Graph by removing edges and nodes that represent functionality that was on the original smart phone application but either cannot be implemented directly on the basic phone or cannot be "recovered"—i.e., substituted for using basic phone functionality. A table is maintained to determine the features that are in a basic phone and the features that can be recovered. The intersection between the list of features on the basic phone and the list of features on the smart phone, provides an initial list of recoverable features. See description of Recovery below.

The resulting graph, called the pruned SAM, represents the complete set of functionalities that a basic phone user can access on the smart phone application. The graph consists of nodes and edges representing the smart app screens that can be reached from the landing page without using features that do not exist or cannot be recovered on a basic phone. See description of FIG. 2 below, which is a recursive algorithm that summarizes the pruning process, and returns the pruned SmartApp model.

TABLE 9

Steps to Prune the SmartApp model, returns a pruned SAM:
1. Create list of all features used by controller, model and view code for this node
2. For each feature on the list
3.   According to recoverability table
4.   If (feature is recoverable)
5.     Continue
6.   Else
7.     remove node and all child nodes
8. For each child node
9.   Prune (node)

Figure 2:
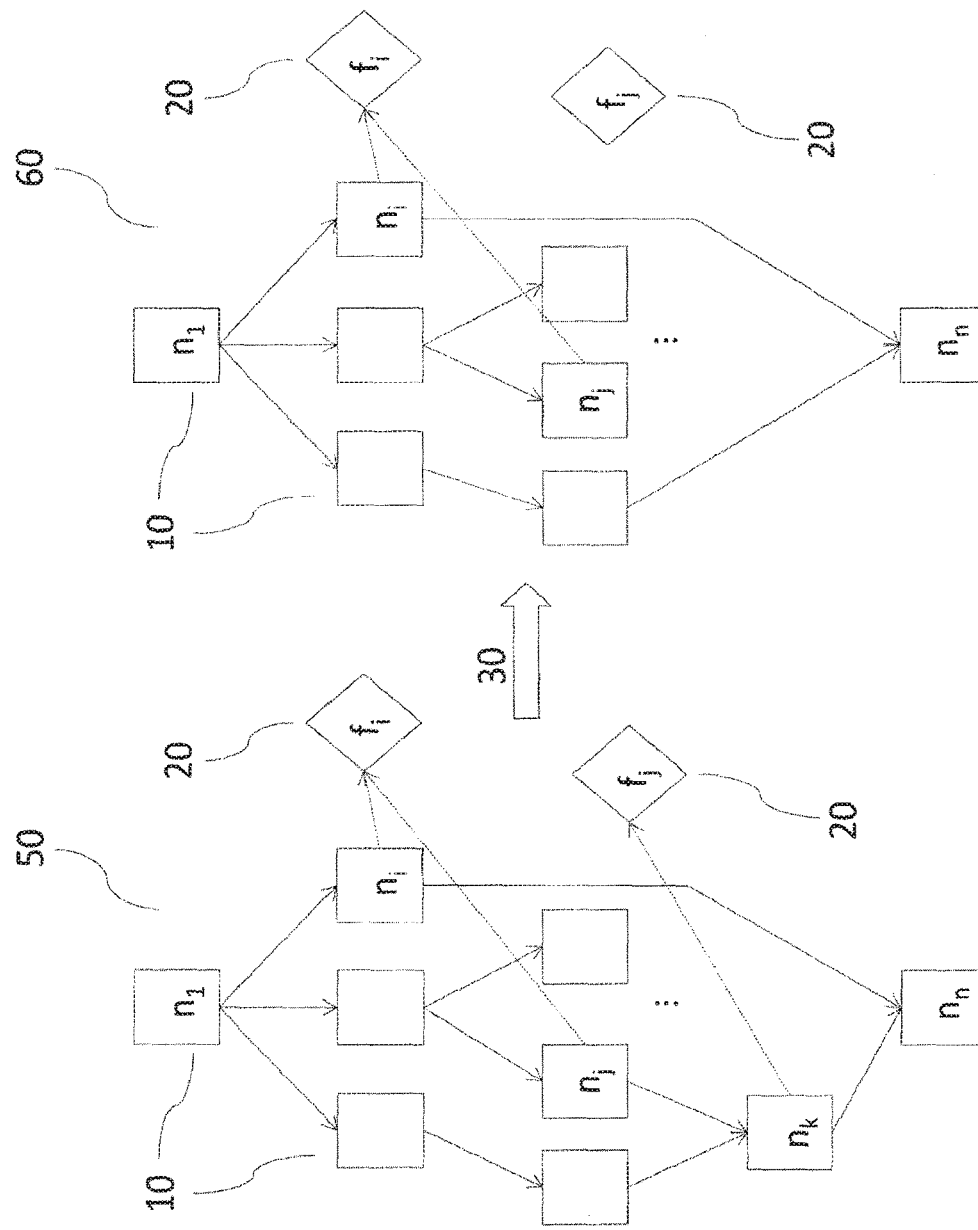
FIG. 2 is a diagram that depicts an example of the process for pruning a UI Frames Graph.

FIG. 2 depicts as an example of the pruning process. The UI Frames Graph 50 is converted via the pruning process 30 to create the pruned SAM 60. In the process, nodes that use the camera (e.g., $n_k$ which accesses $f_j$) are removed, since a camera is a feature that cannot be recovered for a basic phone. The example depicts the identification and removal of a node that requires a camera. The audio recording feature, on the other hand, can be recovered on the basic phone (for example, by calling into a remote phone number and leaving an audio message). Therefore nodes that access the microphone (e.g., nodes $n_i$ and $n_j$ that access $f_i$) are not pruned.

IV. Recovery

Recovery is the process through which GUI widgets on the smart phone application that are impossible to display on the basic phone's user interface are substituted with SMS and USSD messages for the basic phone user's interaction. A GUI widget, also called a GUI control, is a distinct element of the graphical user interface that shows a piece of information that a user can control. Examples of GUI widgets include, but are not limited to, buttons, textboxes, checkboxes, dropdown lists, combo boxes and progress bars. GUI widgets are the visual building blocks that are combined to show all of an application's data that needs to be manipulated by or displayed to a user. Because of the size and rendering capability limitations in the display of most basic phones it is not possible to renderA these types of controls on a basic phone's screen.

The recovery process needs a pre-cursor step in which GUI widgets are identified and placed into a number of broad UI categories for which suitable SMS/USSD substitutions have been identified.

The broad GUI categories are as outlined below:

Input

Text Input—includes text boxes and combo boxes into a which a user types text.

Selection

Exclusive Selection—these are selection widgets from which only one option can be picked. Examples include navigation tabs, dropdown lists, spinners and time and date pickers.

Inclusive Selection—these are widgets that allow a user to make more than one selection from a set of discrete options. Examples include check boxes and list boxes.

Analog Selection—these are widgets that allow a user to drag a pointer or slider to make a selection from a continuous spectrum of values. Examples include sliders, markers on a map and color spectrums.

Output

Simple Output—these are widgets that display a single output item to the user.

Passive Simple Output—these are simple output widgets that don't need further interaction from the user. Examples include labels, textboxes, tooltips, status bar, alerts and toasts.

Interactive Simple Output—these are widgets that provide a single piece of output information, but also require further input from the user. Examples includes dialog boxes.

Collection Output—these are widgets that display multiple discrete pieces of information to the user.

Passive Collection Output—these are collection outputs that need no further user interaction. Examples include tables, trees, graphs that have no interactivity or are disabled.

Interactive Collection Output—these are collection outputs that allow the user to further interrogate the information, for example to drill down for details. Examples include, but are not limited to, interactive trees, and lists of hyperlinks.

Labels

These are widgets that help identify what other widgets are used for. They usually contain an indicative name suggesting the type of information expected by an input widget or the type of information displayed by an output widget. Examples include Labels, TextViews.

SMS and USSD substitutions are then identified for these broad UI categories. The SMS/USSD substitutions are assigned based on heuristics about the ability to deliver the smart phone functionality given the constraints of cognitive load, need for interactivity, and the size and complexity of input or output For each of the above broad I/O categories we know what the best SMS/USSD substitutes are based on the following factors: Need to user limited screen size on a basic phone; Need to reduce user fatigue; Need to reduce cognitive load; Need to reduce human errors at input; Need for user copy of data; and Need to reduce the cost of communication.

Based on these factors, the following table shows an example of the best substitutions for the IO categories, in an IO recovery algorithm (IRA).

TABLE 10

Selected functionality substitution

| | IO Type | | SMS/USSD substitute | Substitution rationale |
|---|---|---|---|---|
| Input | Text Input | | SMS | For simple text input, an SMS provides the simplicity of just entering single input and then sending it. Because most simple text input fits within the 160 character limit of SMS, and single SMS messages cost less than a USSD session, it also more cost effective |
| | Selection | Exclusive | USSD | USSD provides interactivity (it shows the user a menu of options from which the user can select one option by entering a text). It is, therefore, exclusive selection type because the user can simply select one option from any number of possibilities. Because USSD allows the user to select "next", the limited screen size problem is solved, because the user can select "next"or "previous" to "scroll" through the options. |
| | | Inclusive | | USSD's ability to enable a back-and-forth interaction with the user means that a user can sequentially select yes or no for each possible option or enter all selected options using text (e.g. comma separated numbers for each of the options picked). |
| | | Analog | SMS, USSD | For analog selections, a basic phone user has to enter a discrete value due to the limited graphic abilities of basic phones. Either SMS or USSD can be used to tell the user the upper and lower bounds, and the discretization unit, of the spectrum from which they need to make a selection. |
| Output | | | | |
| | Simple | Passive | SMS | An SMS is suitable for conveying simple output because it needs no initial prompting by a user. Further an SMS provides a record for later reference by the user if need be. |
| | | Interactive | USSD | Because USSD provides interactivity (the ability to have back and forth, |

TABLE 10-continued

Selected functionality substitution

| IO Type | | SMS/USSD substitute | Substitution rationale |
|---|---|---|---|
| Collection | Passive (List) | SMS | question answer session with a user) interactive output can be presented to the user as USSD text and the user response can be captured using an accompanying text box.<br>Output in the form of a list is best conveyed to the user as a single SMS or multiple SMSes because an SMS needs no extra user-prompt step and SMS provides the ability to store the data on the user's phone for later reference if need be. |
| | Passive (Graph) | USSD | A collection output that takes the form of a graph (that is tree, grid or other hierarchical representation) is best represented using USSD because USSD can provide top level data items, which can be further drilled down using the interactivity options of USSD. |
| | Interactive | USSD | Because USSD allows each data item to be presented together with action options, the user can interact with a selected subset of the output by indicating using simple text input the action they would to take on each of the output data elements. |
| Labels | | USSD, SMS | The correct substitution is based on the corresponding widget that these labels describe. For example, if a label accompanies a simple text input widget, then the text of that label can be sent to the user using a simple SMS. However, if the label is for an interactive output widget, then it's text property is used in a USSD message to describe to the user the type of input expected. |

The recovery procedure, involves a number of decision points to categorize each widget and then replacement using a pre-defined suitable SMS and USSD substitution as per the table above. In embodiments the recover procedure is automatic and is carried out once the pruned SAM has been generated.

Additional recovery options may be available depending on the functionality of the basic phone. For example, simple graphics (e.g., images, maps, etc.) can be displayed on a basic phone using appropriately selected and positioned ASCII characters (the ASCII characters can be transmitted to the basic phone via SMS/USSD or via any other suitable means). Accordingly, a smart phone application that involves mapping, or displaying simple images (basic shapes, diagrams, etc.), can be substituted with ASCII-based images displayed on the basic phone. Also for example, the location-determination function of a smart phone (e.g., a GPS module) may be replaced on a basic phone using triangulation of cellular tower signals. The resolution and accuracy of the determined location will typically be inferior using triangulation as opposed to GPS, but the basic functionality is recoverable using such methods.

Additionally, in embodiments basic phones are capable of producing sounds, and are also capable of transmitting sounds. Accordingly, certain functionalities of smart phone applications can be recovered using such capabilities.

Throughout this specification, SMS/USSD are used as exemplary messages that can be delivered to basic phones from the emulators described herein. It will be appreciated however that SMS/USSD is only exemplary, and unless otherwise indicated or clear from the context, such references are meant to include other types of messages that can be delivered and processed by a basic phone (e.g., audio messages, ASCII characters for creating an image on a basic phone screen, and the like).

It will be appreciated that certain functions of a smart phone application may be incapable of implementation on a basic phone and also unrecoverable. A function is unrecoverable where there is no adequate substitute function. The set of unrecoverable functions will vary depending on the basic phone's capabilities, but might include, for example, a camera, gyroscope, accelerometer, and the like.

The set of smart phone application functions that includes both recoverable and unrecoverable functions is referred to herein as "missing functions."

It will be further appreciated that certain functions of a smart phone application may be fully executable on a basic phone—i.e., no substitution or recovery is necessary for the basic phone to carry out the function. Examples include playing an audio message/sound.

Example of Recovery

In this example, we use ID-Sasa, an Android application that assists people in Kenya with their National ID card application process. The top-level functionalities of ID-Sasa are:

Prepare application. This functionality helps the user gather all the required documents for an ID Card application, helps the user find the correct location of their registration office and gives the user a summary of the process steps to expect customized according to the applicant's profile (age, county of origin and current residence area).

Track application. This functionality helps the user track the status of their ID card application once they have submitted their documents to the correct government office. A user submits their waiting id number and the app tells the user what stage of processing their application has reached e.g. "in transit from local office to processing bureau", "identity verification", "printing", "delivered at local office", etc.

Report. This functionality helps a user give feedback about the id application process including reporting positive experiences as well as negative ones such inefficiencies and incidences of corruption.

Our example focuses on the "Prepare application" functionality, specifically the step of that functionality where a user profile is created.

The sequence of screen transitions begins with the landing screen for the application, followed by a number of options that can be selected from the landing screen. For this example, on the landing screen there are three top-level functionalities—Apply, Track, and Report (plus, optionally, additional choices such as a "Customize" functionality, etc.). Selection of any of these options will take the user to another screen, where additional options and input/output screens may appear. Each such screen in the application is represented by a node in the UI Frames Graph.

When the user clicks the "Apply" tab, the app checks if there is already a user profile stored on the phone. If the app is being used for the first time, it prompts the user to create his/her profile as shown on the second screen.

Now, the recovery procedure relies on the SmartApp Model on which for every node of the UI Frames Graph, there's an associated controller code class and a view code class.

For example, the root node of UI Frames graph for the ID-Sasa application represents the landing screen which is shown, for example, as node $n_l$ in FIG. 1. The controller code for this node is called MainActivity.Java, as is the default case for an application's entry point in the Android development environment. Equivalent naming conventions to identify an application's entry point (landing page) can be found in other mobile OS—programming language combinations. Inside MainActivity.Java, there's code that points to the associated view code file. Using the keyword tables defined earlier, we know that this line of code is the one shown below.

This line of code tells us that the view file (which in Android is a layout xml file) is found in the layout subdirectory of the resources directory and is called activity_main.xml.

Using this file path information, we can go through the Android code tree (i.e., view code for a root of a UI Frames Graph and find the activity_main.xml which looks as shown below. Using the code shown below and a basic xml parser we can see that there are three top level buttons as indicated by the xml elements called "Button".

TABLE 11

```
<LinearLayout xmlns:android="http://schemas.android.com/apk/res/android"
    xmlns:tools="http://schemas.android.com/tools"
    android:id="@+id/LinearLayout1"
    android:layout_width="match_parent"
    android:layout_height="wrap_content"
    android:orientation="vertical"
    tools:context=".MainActivity" >
    <LinearLayout
        android:id="@+id/button_layout"
        android:layout_width="match_parent"
        android:layout_height="wrap_content"
        android:background="#f0f0f0"
        android:weightSum="3"
        android:divider="?android:attr/dividerVertical"
        android:showDividers="middle"
        android:dividerPadding="10dp"
        android:layout_weight="1.62" >
        <Button
            android:id="@+id/button_apply"
            style="?android:attr/borderlessButtonStyle"
            android:layout_width="0dp"
            android:layout_height="wrap_content"
            android:layout_weight="1"
            android:drawableLeft="@drawable/ic_apply"
            android:onClick="sendMessage"
            android:text="prepare"
            android:textStyle="bold"
            android:divider="@drawable/ic_vertical_line"
            android:textSize="18sp"/>
        <Button
            android:id="@+id/button_track"
            style="?android:attr/borderlessButtonStyle"
            android:layout_width="0dp"
            android:layout_height="wrap_content"
            android:layout_weight="1"
            android:drawableLeft="@drawable/ic_track"
            android:onClick="sendMessage"
            android:text="track"
            android:textStyle="bold"
            android:textSize="18sp" />
```

TABLE 11-continued

```
        <Button
            android:id="@+id/button_report"
            style="?android:attr/borderlessButtonStyle"
            android:layout_width="0dp"
            android:layout_height="wrap_content"
            android:layout_weight="1"
            android:drawableLeft="@drawable/ic_report"
            android:onClick="sendMessage"
            android:text="report"
            android:textStyle="bold"
            android:textSize="18sp" />
    </LinearLayout>
    <HorizontalScrollView
        android:id="@+id/horizontalScrollView1"
        android:layout_width="match_parent"
        android:layout_height="wrap_content"
        android:layout_weight="3.24" >
        <LinearLayout
            android:layout_width="match_parent"
            android:layout_height="match_parent"
            android:orientation="horizontal" >
            <ImageView
                android:id="@+id/imageView1"
                android:layout_width="280dp"
                android:layout_height="202dp"
                android:src="@drawable/bribechart" />
        </LinearLayout>
    </HorizontalScrollView>
    <View
      android:layout_width="fill_parent"
      android:layout_height="2dp"
      android:paddingTop="50dp"
      android:paddingLeft="5dp"
      android:paddingRight="5dp"
      android:layout_row="1"
      android:background="@color/grey" />
    <FrameLayout
      android:layout_width="match_parent"
      android:layout_height="wrap_content"
      android:layout_weight="1.62" >
      <fragment
android:id="@+id/fragment1"android:name="com.ibm.kenya.app.nationalid.ui.fragm
ents.UpdateStoriesFragment"
          android:layout_width="fill_parent"
          android:layout_height="wrap_content" />
    </FrameLayout>
</LinearLayout>
```

The ids of these buttons are, respectively, "button_apply", "button_track", and "button_report". From the code we can see that the three buttons all fire up the same function as per their "onClick" attribute and are grouped tightly within the same "LinearLayout" xml element. This suggests that they are an exclusive selection type. Using our formalism, as shown in Table 1, we know that this functionality can be substituted with a USSD message. An example USSD message may ask the user "What would you like to do?" and provide three options (followed by instructions to enter the number matching the choice) such as:

1: Apply
2: Track
3: Report

On the controller code inside MainActivity.java, we see that when the "apply" button is clicked the code snippet below is supposed to be executed. The code starts a new Activity called OrganizerActivity.

TABLE 12

```
applyButton.setOnClickListener(new OnClickListener( ) {
            @Override
            public void onClick(View v) {
                    Intent intent = new Intent(MainActivity.this,
OrganizerActivity.class);
                    startActivity(intent);
            }
    });
```

Our converter follows the path of execution and examines the code within the OrganizerActivity.java class. We find the associated view class using this line of code found within OrganizerActivity.java setContentView(R.layout.activity_organizer);

When we examine the layout xml file pointed to by R.layout.activity_organizer, just as previously for the MainActivity, we find that it looks as shown in the following code.

TABLE 13

```
<FrameLayout xmlns:android="http://schemas.android.com/apk/res/android"
    xmlns:tools="http://schemas.android.com/tools"
    android:id="@+id/container"
    android:layout_width="match_parent"
    android:layout_height="match_parent"
    tools:context=".OrganizerActivity"
    tools:ignore="MergeRootFrame" >
    <TabHost
       android:id="@android:id/tabhost"
       android:layout_width="match_parent"
       android:layout_height="match_parent" >
       <LinearLayout
          android:layout_width="match_parent"
          android:layout_height="match_parent"
          android:orientation="vertical" >
          <TabWidget
             android:id="@android:id/tabs"
             android:layout_width="match_parent"
             android:layout_height="wrap_content" >
          </TabWidget>
          <FrameLayout
             android:id="@android:id/tabcontent"
             android:layout_width="match_parent"
             android:layout_height="match_parent" >
             <LinearLayout
                android:id="@+id/tabWhatToBring"
                android:layout_width="match_parent"
                android:layout_height="match_parent" >
             </LinearLayout>
             <LinearLayout
                android:id="@+id/tabWhereToGo"
                android:layout_width="match_parent"
                android:layout_height="match_parent" >
             </LinearLayout>
             <LinearLayout
                android:id="@+id/tabHowToApply"
                android:layout_width="match_parent"
                android:layout_height="match_parent" >
             </LinearLayout>
          </FrameLayout>
       </LinearLayout>
    </TabHost>
</FrameLayout>
```

This view files shows the top level widget is "TabHost". Using our GUI widget classification schema, we know that we have another exclusive selection type and that the tab options can be represented using USSD.

However, we can also see within the OrganizerActivity controller class that by default (or when the first tab is selected), the code shown below will be executed.

TABLE 14

```
public void onTabSelected(ActionBar.Tab tab,
                FragmentTransaction fragmentTransaction) {
           if(tab.getPosition( ) == 0) {
                mFragment = new SupportingDocumentsFragment( );
       getSupportFragmentManager( ).beginTransaction( ).replace(R.id.container,
mFragment).commit( );
           }
```

A fragment called SupportingDocumentsFragment is loaded. We now examine both the controller and view files associated with this fragment. In that fragment's controller class, we find the piece of code shown below, which creates another type of user-defined fragment called UserProfile-DialogFragment.

TABLE 15

```
public void onActivityCreated(Bundle savedInstanceState) {
           adapter = new SupportingDocsListAdapter(this.getActivity( ),
```

TABLE 15-continued

```
        getGroup( ), getChilden( ));
            setListAdapter(adapter);
            getExpandableListView( ).setOnChildClickListener(this);
            if(!DatabaseUtil.isUserProfileCreated(this.getActivity( ))) {
                UserProfileDialogFragment dialog = new
UserProfileDialogFragment( );
                dialog.show(this.getActivity( ).getSupportFragmentManager( ),
"UserProfileDialog");
            }
            super.onActivityCreated(savedInstanceState);
        }
```

When we examine the controller class for this fragment, we see that it points to a view code file using the line shown below.

View userProfileView=inflater.inflate(R.layout.fragment_user_profile, null);

We then examine this view file and it see that it looks as shown in the code below.

TABLE 16

```
<RelativeLayout xmlns:android="http://schemas.android.com/apk/res/android"
    android:layout_width="match_parent"
    android:layout_height="match_parent"
    android:orientation="horizontal"
    android:background="#00000000">
    <TextView
        android:id="@+id/textViewReportfeedbackTitle"
        android:layout_width="wrap_content"
        android:layout_height="wrap_content"
        android:layout_alignParentLeft="true"
        android:layout_alignParentTop="true"
        android:text="Profile"
        android:textSize="18sp" />
    <TextView
        android:id="@+id/TextViewYoB"
        android:layout_width="wrap_content"
        android:layout_height="wrap_content"
        android:layout_alignParentLeft="true"
        android:layout_below="@+id/textViewReportfeedbackTitle"
        android:layout_marginTop="19dp"
        android:text="Year Of Birth"
        android:textSize="12sp" />
    <EditText
        android:id="@+id/editTextYoB"
        style="@style/EditTextIDSasaTheme"
        android:layout_width="wrap_content"
        android:layout_height="wrap_content"
        android:layout_alignBottom="@+id/TextViewYoB"
        android:layout_alignParentRight="true"
        android:layout_toRightOf="@+id/TextViewCountyOfResidence"
        android:ems="10" >
    </EditText>
    <TextView
        android:id="@+id/TextViewCountyOfOrigin"
        android:layout_width="wrap_content"
        android:layout_height="wrap_content"
        android:layout_alignParentLeft="true"
        android:layout_below="@+id/TextViewYoB"
        android:layout_marginTop="26dp"
        android:text="County of Origin"
        android:textSize="12sp" />
    <Spinner
        android:id="@+id/spinnerCountyOfOrigin"
        style="@style/SpinnerAppTheme"
        android:layout_width="wrap_content"
        android:layout_height="wrap_content"
        android:layout_alignBottom="@+id/TextViewCountyOfOrigin"
        android:layout_alignLeft="@+id/SpinnerCountyOfResidence"
        android:layout_alignParentRight="true"
        android:layout_below="@+id/TextViewYoB" />
    <TextView
        android:id="@+id/TextViewCountyOfResidence"
        android:layout_width="wrap_content"
        android:layout_height="wrap_content"
```

TABLE 16-continued

```
        android:layout_alignParentLeft="true"
        android:layout_below="@+id/TextViewCountyOfOrigin"
        android:layout_marginTop="20dp"
        android:text="Division, Location or SubLocation"
        android:textSize="12sp" />
    <EditText
        android:id="@+id/ResidenceArea"
        android:layout_width="wrap_content"
        android:layout_height="wrap_content"
        android:layout_alignParentRight="true"
        android:layout_below="@+id/TextViewCountyOfOrigin"
        android:layout_marginTop="20dp"
        android:layout_toRightOf="@+id/TextViewCountyOfResidence"
        android:textSize="16sp" />
</RelativeLayout>
```

Using our GUI widget categorization algorithms, we classify the widgets found on this User Profile creation screen as follows.

The first two TextView widgets are interpreted as labels because they have pre-set text. The text values of these labels are used to compose the instructions that a basic phone user gets either through an SMS or USSD message depending on what widget they are labeling.

The first EditText widget is interpreted as a simple text input box and our converter notes that it can be substituted with a simple SMS. However, because we know that all of these widgets are part of a larger dialog widget (which is essentially an interactive output widget), we know from our algorithm that we can substitute the larger widget with a USSD message.

The third TextView, just like the first two, is also interpreted as a label.

The first Spinner is interpreted as an exclusive selection type and substituted for using a USSD message.

The last TextView, just like the previous ones is interpreted as a label.

The final EditText is interpreted as a simple input and could possibly be substituted using a simple SMS. However, just like with the first EditText widget, our converter understands that it belongs a bigger dialog widget and that it can be subsumed within a bigger USSD interaction.

Based on these substitutions, therefore, the USSD interactive session represented by the following three nodes can be composed to represent this UserProfile dialog. In a first node of the three nodes is the statement and question "In order to customize your profile, please answer the following three questions. What is your year of birth?" This node connects to a node containing "Select your country of origin from the list below or enter 0 for more options: (1) Baringo; (2) Bornet; (3) Bungoma; (4) Busia; (5) Elgeyo Marakwet; (0) more options". This node is followed by a node containing "What is the name of your residence area? (Sub-Location, Location, or Division)?" Each of the USSD inquiry nodes is followed by allowing the user to input data.

Generation of Basic Phone Interaction Graph (BPIG)

Using the recovery procedure illustrated by the example above, a graph showing the set of USSD/SMS interactions representing the supported functionality for the entire application is then generated. This graph is called the Basic Phone Interaction Graph (BPIG) and is topologically equivalent to the pruned version of the UI Frames Graph (i.e., the Pruned SAM). However, the contents of the nodes may differ.

The contents of the BPIG nodes are instructions that are used by the Interaction Handler (IH, described herein) to create messages to the user basic phone. The instructions can be used by the IH to do any of the following representative examples: present results (e.g., the results of a calculation or another operation); request an action from the user (e.g., request input of data); provide an informative message (e.g., a progress update on a task); and provide a graphical representation of an image (e.g., an ASCII representation of an image or a bitmap representation of an image); etc. The instruction in the BPIG node may further contain metadata such as formatting parameters and the like, although typically such metadata is used by the IH only in constructing a message and will not be part of the message itself.

In embodiments, for example, the BPIG nodes represent USSD or SMS "frames" (instead of smart phone application frames). That is, the instruction in a BPIG node can be used by the IH to construct a USSD or SMS message that can be transmitted to the basic phone user.

For example, following the ID-Sasa app used before, one branch of the BPIG representing the User Profile creation functionality would consist putting together all the USSD message flows that enable a user complete that function. This part of the BPIG would appear as follows. In a first node is the request "What would you like to do? Enter the number matching your choice: (1) Apply; (2) Track; (3) Report." This node connects to a node containing "In order to customize your profile, please answer the following three questions. What is your year of birth?" This node connects to a node containing "Select your country of origin from the list below or enter 0 for more options: (1) Baringo; (2) Bornet; (3) Bungoma; (4) Busia; (5) Elgeyo Marakwet; (0) more options". This node is followed by a node containing "What is the name of your residence area? (Sub-Location, Location, or Division)?"

The algorithm for generation of the BPIG is as shown below.

TABLE 17

Traverse "Frames Graph" and for each node:
Use I/O Recovery Algorithm (IRA) to generate basic phone screens (showing USSD/SMS interaction). Each of these screens is a BPIG node.
To the BPIG root node, append an initialization node (i.e., start-up screen e.g., showing app short code entry)
Connect all BPIG nodes using edges as on corresponding UI Frames Graph Once the BPIG is generated, it is used in the generation of the User Emulator, a component of code that sits between the pruned smart phone application and the incoming and outgoing basic phone user messages.

The BPIG comprises machine readable information, and is typically stored in a memory on the server.

Execution

The final step in our conversion process is Execution. Execution enables a basic phone user to access and run a converted smartphone application. To achieve this, the repository of converted applications and their corresponding source code is installed on an external machine or system. To run the converted application an additional component, called the User Emulator is created.

The User Emulator is a module that is responsible for interacting with the basic phone at the time when a basic phone user wants to run a converted smart phone application. It encapsulates user requests (SMS/USSD messages) as input variables and supplies them as UI input to a running instance of the pruned, reduced functionality, smart phone application. In addition, it reads the converted application's results (UI output) and encapsulates the results in SMS/USSD messages to be sent back to the user's basic phone. The SMS/USSD message options are stored in the nodes of the BPIG, either directly or as instructions that are used to create such messages.

There are two main modules of the User Emulator—i) the Application Tracer (AT) and ii) the Interaction Handler (IH). The AT kicks off an instance of the SmartApp (i.e. the Smart phone application) on the server. As the application runs on the server, references (by the AT) to the application's corresponding pruned SAM and BPIG follow (shadow) the application. That is, the AT tracks the execution of the SmartApp, determines a location in the execution of the SmartApp, and determines the corresponding location (node) within the pruned SAM. The node in the pruned SAM is correlated by the AT to a node in the BPIG, and the AT then extracts the instruction that is contained within the identified BPIG node. The extracted instruction is passed to the Interaction Handler (see below). The pruned SAM is used to determine when the user reaches a screen (node) with pruned child nodes. Once the user has completed that screen, the AT will bring the user to the termination screen signaling the end of the application.

The Interaction Handler manages the interaction between the basic phone and the application by reading the instruction (e.g., SMS/USSD messages) in the BPIG node referenced/extracted by the AT. It also reads and submits the SMS/USSD input collected from the basic phone user.

To achieve this interaction with the running application a software module runs a UI testing tool, such as robotium or uiautomator for Android applications. These tools allow for interaction between I/O widgets. As a result, when a screen in the application appears with a specific widget that requires input from the user, the user can send their input and the IH will issue it to the application through the testing tool. In addition, widgets that have output of information for the user can be retrieved with a testing tool and in turn wrapped up in the corresponding SMS/USSD message.

The User Emulator is installed on the preferred external system (i.e. the server, as defined herein). Preferred external systems include one or more smart phones, one or more servers, and/or one or more servers providing a service that performs this execution. The components of the emulator (AT and IH) comprise machine-readable instructions on the server as appropriate to enable the appropriate functionality.

Figure 3:
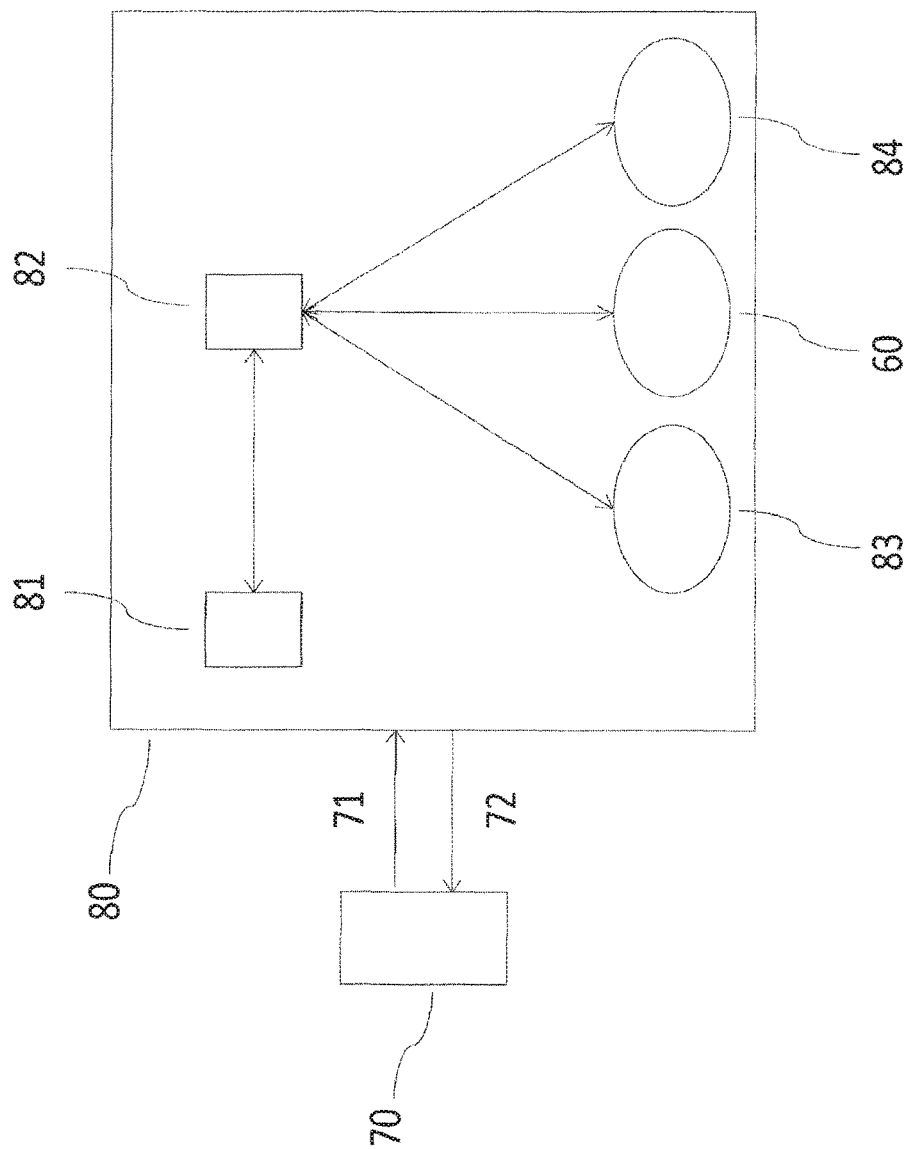
FIG. 3 is a block diagram of an emulator that interacts with the basic phone user while the user access the converted application.

FIG. 3 is a block diagram of an example User Emulator that interacts with the basic phone user while the user access the converted application. Note that the emulator resides on a remote server (i.e., can reside on a smart phone, server, and/or distributed on devices on the network). In FIG. 3, Basic Phone 70 provides user input 71 and receives App output 72 from Emulator 80. Examples of user input 71 and App output 72 include SMS and USSD messages. Emulator 80 includes Interaction Handler 81 and Application Tracer 82. Application Tracer 82 references BPIG 83, pruned SAM 60, and SmartApp 84.

It will be appreciated that the screen size of basic phones may vary. Accordingly, in embodiments, the screen size of the basic phone of the user may be determined in order to ensure that ASCII images or other formatted messages are appropriately formatted. Such determination may be accomplished by requiring the user to enter the basic phone model number, or may be automatically determined if the emulator can identify the basic phone model. In embodiments, the screen size is neither determined nor factored into the formatting of the messages sent to the basic phone. In such embodiments it may be convenient to assume and use a minimum screen size (one that is equivalent to the smallest screen size commonly on the market).

In summary the present invention converts a smart phone application to a basic phone application by (a) a one time conversion of the smart phone application to a basic phone interaction graph, and (b) the creation of a user emulator to manage interaction between basic phone users and the converted app.

To start using the basic phone application, once the User Emulator code is generated. The components can be installed on a back-end system. The system can range in complexity from a simple setup involving installing the converter and emulator components on a regular smart phone; to a robust and scalable setup involving a powerful server whose disk is partitioned into different mobile operating systems.

Figure 4:
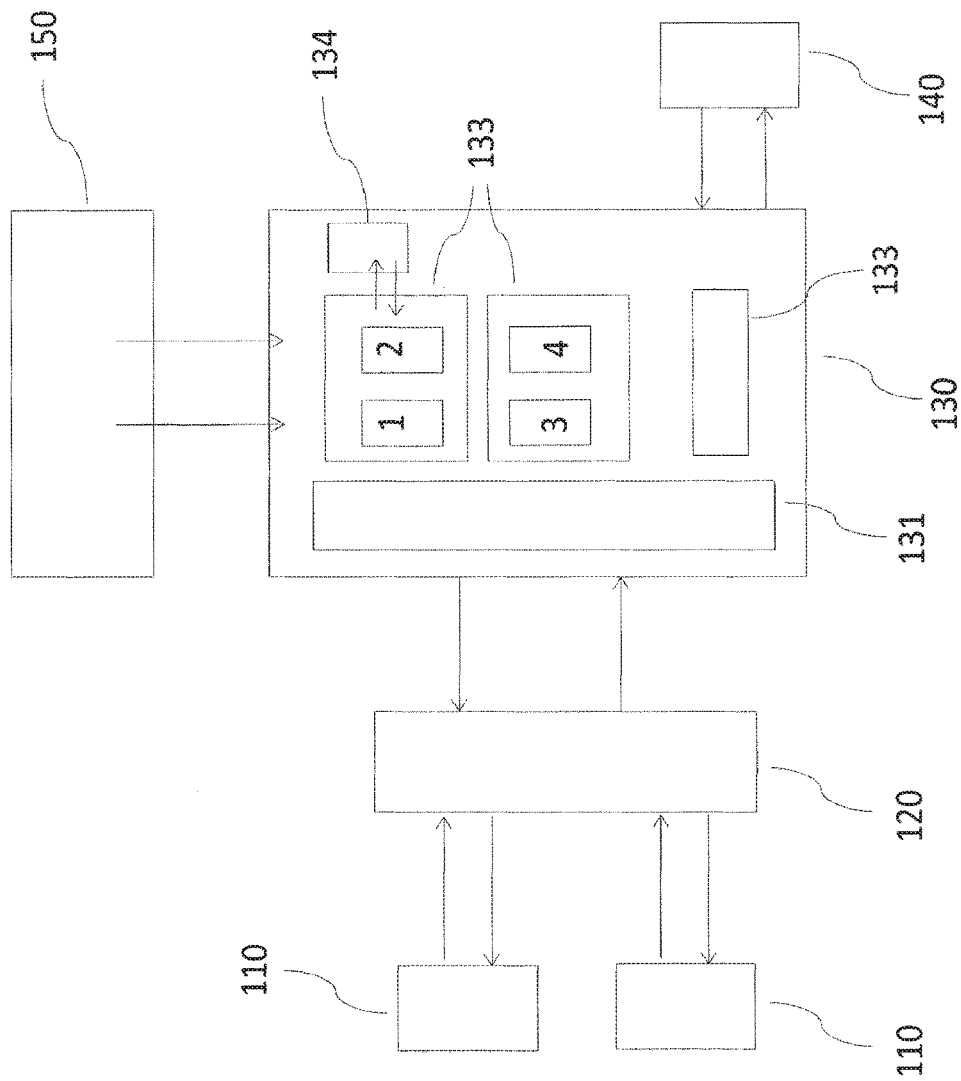
FIG. 4 is a block diagram showing the architecture of conversion and execution of smartphone application into a basic phone application using a server based application-as-a-service offering.
Figure 5:
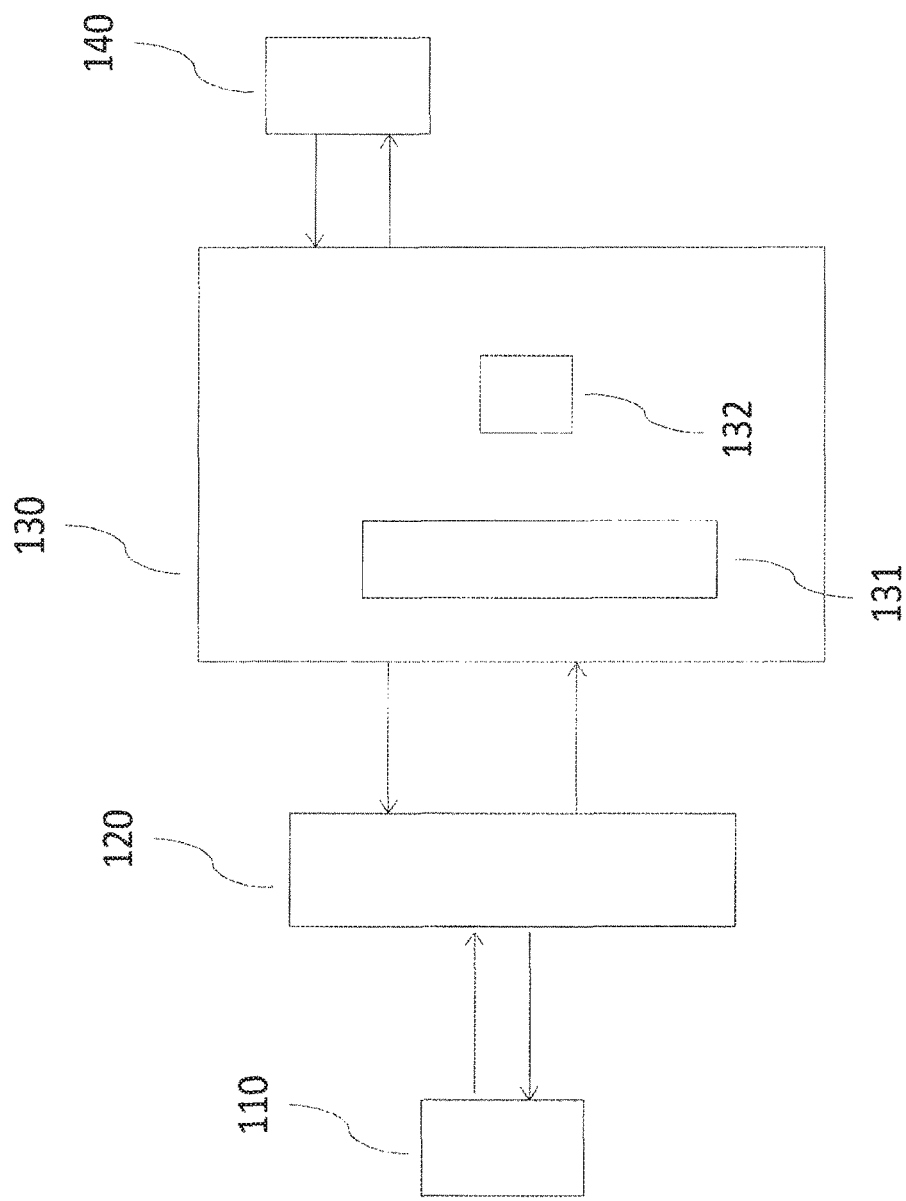
FIG. 5 is a block diagram showing the architecture using a smart-phone based application-as-a-service offering for the conversion.

FIG. 4 shows an example set up in which applications are installed on a server while FIG. 5 shows an example set up in which the backend is simply a smart phone running an app that is shared by multiple basic phone users.

Referring to FIG. 4, User Emulator 131 is a module of code that runs on the back end server 130 and serves as an interlocutor between all external communications and apps (1, 2, 3, and 4) installed on various mobile OS partitions (133) of server 130. Basic phones 110 are able to interact with the User Emulator 131 with SMS/USSD Gateway 120 facilitating interactions. Software 150 according to the invention generates the User Emulator 131 and pruned versions of the smart applications 1, 2, 3 and 4, and the smart applications 1, 2, 3, and 4 also are used to create database 134 of Mobile OS and Language keywords. Server 130 is able to access the Internet 140 to obtain other inputs or applications.

On the smart phone based set up shown on FIG. 5, User Emulator 131 is in the form of an "app", which essentially run as a daemon process. Application 132 is able to be run on basic phone 110 with SMS/USSD Gateway 120 facilitating interactions. Furthermore Smart Phone 130 is able to access the Internet 140 to obtain other applications or other input for Application 132.

In a preferred embodiment, the final assemblage of either of the above set ups involves two steps: (1) Install the pruned smart phone application on the backend system; and (2) Install and run the User Emulator on the backend system.

Once this assembly is completed, basic phone users can now access the application using an SMS or USSD code and initiate a message created by the application owner.

In embodiments, a basic phone user can request a list of apps that are available using the methods described herein. Such a list can be compiled and sent from the server via SMS or USSD, and this may represent the first step in the process of a basic phone user interacting with the systems described herein.

As used herein, the term "basic phone" is synonymous with "feature phone" and "dumb phone" as such terms are used in the art. Furthermore, "basic phone" as used herein is intended to include phones that have substantially limited or no ability to transmit and receive data. Examples include traditional "smart" phones (or tablets) that are outside of the range of data-enabled networks (e.g., 2G or 3G networks) and are only able to use their mobile telephony functionality. Examples also include "smart" phones (or tablets) where the mobile data functionality has been disabled.

In embodiments, the basic phone of the invention is one that is limited to the following I/O and display functionality (or any subset thereof): sending an SMS or USSD message; receiving an SMS or USSD message; displaying one or a plurality of ASCII characters; generating a noise; and recording a sound. Such limitation may be permanent and due to hardware/software restrictions or may be temporary and due to limited or no connectivity to a data network.

In embodiments, basic phones may generate an SMS message in several ways, all of which are within the scope of the invention unless specified otherwise. For example, the SMS message may be directly generated by the user, or may be generated by a SIM application toolkit (STK) in response to input from the user.

As used herein, and unless specified otherwise, a "server" is meant to include any fixed or mobile device capable of carrying out the back-end functionality of the systems described herein (i.e., receiving and processing requests from a basic phone user, running a smart phone application, running the emulator functions of Application Tracer and Interaction Handler, optionally accessing the internet, etc.). Examples of devices suitable for use as a server include non-mobile special purpose computers, non-mobile general purpose computers, and mobile devices other than basic phones (e.g., smart phones, tablets, and the like). The server is configured to interact with a basic phone user. For example the server contains a SIM or other connection to a cellular network.

Using the methods and systems of the invention, a smart phone application is executed on a basic phone. It will be appreciated that the term "executed" in this context means that functions of the smart phone application are carried out on a remote server and are thereby made available to the basic phone user. That is, the smart phone application is not carried out directly on the hardware of the basic phone but rather is carried out on the remote server and an I/O interface (the IH) enables the results to be seen on the basic phone.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations, specified process steps, and/or block diagrams of methods, apparatus (systems) and computer program products according to embodiments of the invention. It will be understood that each block of the flowchart illustrations and/or block diagrams, process steps and architecture features; and combinations of blocks in the flowchart illustrations and/or block diagrams and/or such steps and/or features, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures and/or specification description illustrate the architecture, functionality, and operation of possible implementations of systems, methods and computer program products according to various embodiments of the present invention. In this regard, each block in the flowchart or block diagrams or description may represent a module, segment, or portion of code, which comprises one or more executable instructions for implementing the specified logical function(s). It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It is to be understood that while the invention has been described in conjunction with the preferred specific embodiments thereof, the foregoing description is intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. It is also to be understood that the terminology used herein is for the purpose of describing particular embodiments only and is not intended to be limiting. Any combination of the embodiments described herein is intended to be part of the invention, as if such combinations had been laboriously set forth in this disclosure.

What is claimed is:

1. A method of executing a smart phone application on a basic phone, the method comprising the steps of:
    (a) correlating an activity by a smart phone application executing on a server with a node in a pruned Smart Application Model (SAM);
    (b) identifying a node in a Basic Phone Interaction Graph (BPIG) that correlates with the node in the pruned SAM from (a);
    (c) extracting an instruction from the BPIG node identified in (b);
    (d) construction a message from the extracted instruction; and
    (e) transmitting the message to the basic cell phone,
    the method further comprising determining that the node in the pruned SAM is a terminal node, and returning a termination message after transmitting the message to the basic cell phone.

2. The method of claim 1, further comprising, prior to (b), initiating the smart phone application on a server in response to receiving a request from the basic cell phone to execute the smart phone application.

3. The method of claim 1, wherein steps (a)-(c) are carried out by an application tracer function of an emulator on the server.

4. The method of claim 1, wherein steps (d)-(e) are carried out by an interaction handler function on an emulator on the server.

5. The method of claim 1, further comprising receiving an input from the basic phone after transmitting the message.

6. The method of claim 1, further comprising receiving an input from the basic phone after transmitting the message, wherein the received input is provided to the smart phone application to generate a subsequent activity.

7. The method of claim 1, further comprising receiving an input from the basic phone after transmitting the message, wherein the received input is provided to the smart phone application to generate a subsequent activity, and wherein steps (a)-(c) are repeated with the subsequent activity.

8. The method of claim 1, wherein the pruned SAM comprises features of the smart phone application that can be implemented on the basic phone or that are recoverable for implementation on the basic phone.

9. The method of claim 1, further comprising, prior to step (a), generating the pruned SAM by comparing a features table of the smart phone application with a recoverability table.

10. The method of claim 1, wherein the activity by the smart phone application is selected from a feature, an Input/Output (I/O) widget, and a screen.

11. The method of claim 1, wherein the server is selected from a special purpose computer, a general computer, and a mobile device.

12. The method of claim 1, wherein the smart phone application comprises features that generate graphics and interactive displays.

13. A server comprising machine-readable instructions configured to implement the method of claim 1.

* * * * *